United States Patent [19]
Yamaguchi

[11] Patent Number: 5,297,670
[45] Date of Patent: * Mar. 29, 1994

[54] APPARATUS FOR DRIVING ROLLERS IN ROLLER HEARTH KILN

[75] Inventor: Minoru Yamaguchi, Ichinomiya, Japan

[73] Assignee: NGK Insulators, Ltd., Nagoya, Japan

[*] Notice: The portion of the term of this patent subsequent to Jun. 9, 2009 has been disclaimed.

[21] Appl. No.: 843,231

[22] Filed: Feb. 28, 1992

Related U.S. Application Data

[62] Division of Ser. No. 488,838, Mar. 6, 1990, Pat. No. 5,119,922.

Foreign Application Priority Data

Mar. 17, 1989 [JP] Japan ................... 1-31224
Sep. 7, 1989 [JP] Japan ................. 1-105246
Sep. 11, 1989 [JP] Japan ................. 1-106314

[51] Int. Cl.$^5$ ............................ B65G 13/06
[52] U.S. Cl. ................... 198/789; 403/301; 403/329; 384/549
[58] Field of Search ........... 198/780, 781, 789, 790, 198/791; 432/236, 246; 384/549, 566; 403/301, 302, 306, 309, 313, 329

[56] References Cited

U.S. PATENT DOCUMENTS

| | | | |
|---|---|---|---|
| 3,038,322 | 6/1962 | Wilson | 64/8 |
| 3,608,876 | 9/1971 | Leaich | 198/789 X |
| 3,867,748 | 2/1975 | Miller | 198/789 X |
| 4,131,420 | 12/1978 | Miller | 432/246 |
| 4,242,782 | 1/1981 | Hanneken et al. | 198/789 X |
| 4,330,268 | 5/1982 | Kremheller et al. | 198/791 X |
| 4,343,395 | 8/1982 | Lippert et al. | 198/789 X |
| 4,500,287 | 2/1985 | Carraroli et al. | 198/781 X |
| 4,751,776 | 6/1988 | Reunamaki | 432/246 |

FOREIGN PATENT DOCUMENTS

| | | |
|---|---|---|
| 0335216 | 10/1989 | European Pat. Off. . |
| 48-7682 | 3/1973 | Japan . |
| 60-180991 | 11/1985 | Japan . |
| 60-180992 | 11/1985 | Japan . |
| 64-4072 | 2/1989 | Japan . |
| 0052983 | 2/1990 | Japan .................... 432/246 |

Primary Examiner—Cheryl L. Gastineau
Attorney, Agent, or Firm—Adduci, Mastriani, Schaumberg & Schill

[57] ABSTRACT

A roller driving apparatus for use in a roller hearth kiln has a kiln tunnel and kiln side walls. The apparatus includes a rotary drive shaft, a holder fixedly mounted at one end thereof on the rotary drive shaft, a metal connection pipe detachably mounted on the other end of the holder and including a positioning aperture formed therein, a ceramic roller, and a metallic receiver roller rotatably supporting the driven end of the ceramic roller through a metallic coil spring. The positioning aperture extends along the longitudinal axis of the connection pipe, and the ceramic roller is mounted at a drive end thereof on an end of the connection pipe opposite to the holder for receiving drive power from the rotary drive shaft. The ceramic roller has another, driven end, and extends through the kiln tunnel through one of the kiln side walls of the roller hearth kiln. An engaging arrangement is fixedly mounted at one end of the holder, for selectively engaging with the positioning aperture of the connection pipe, and the metallic coil spring is wound on an outer periphery of the driven end of the ceramic roller.

5 Claims, 5 Drawing Sheets

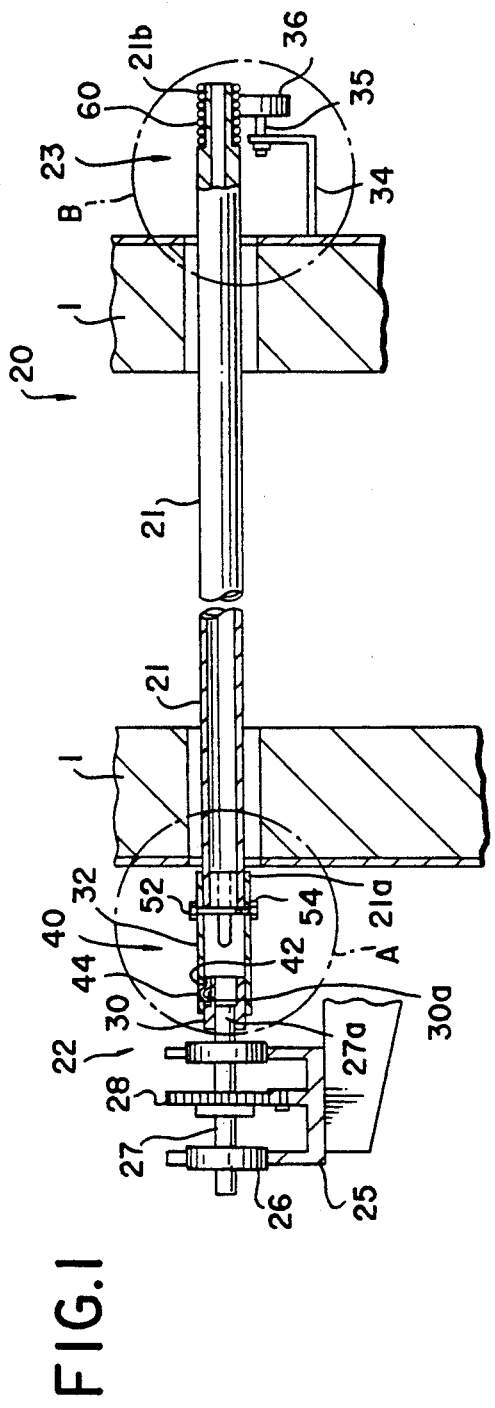
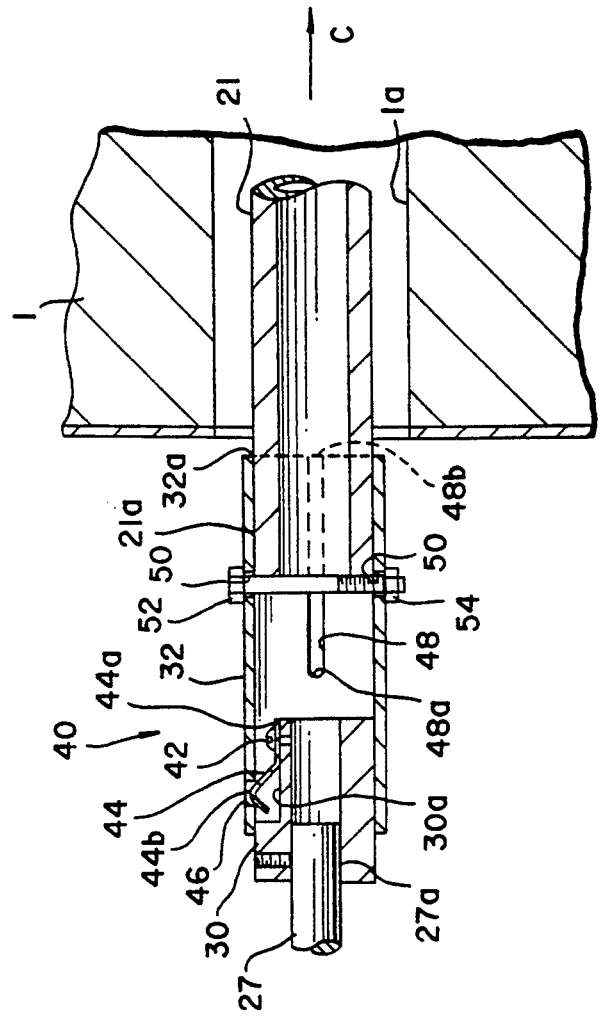
FIG.1
FIG.2

FIG.5
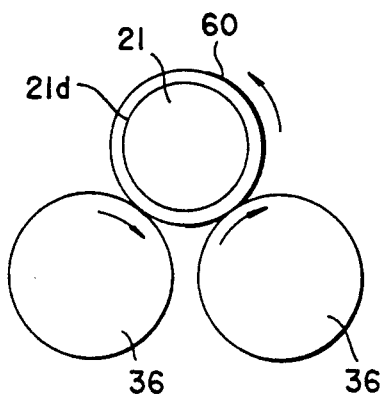
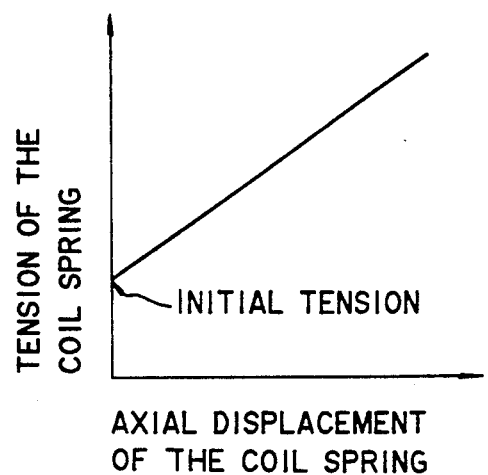
FIG.6
FIG.7
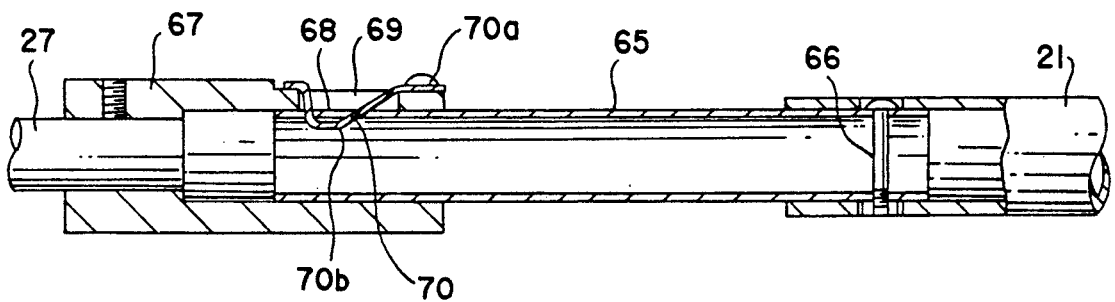

5,297,670

APPARATUS FOR DRIVING ROLLERS IN ROLLER HEARTH KILN

This is a division of application Ser. No. 07/488,838, filed Mar. 6, 1990, now U.S. Pat. No. 5,119,922.

BACKGROUND OF THE INVENTION

The present invention relates to an improved apparatus for driving rollers in a roller hearth kiln and more particularly to a combination of connection means for connecting a ceramic roller with a metallic drive shaft.

Various types of roller hearth kilns are known which are adapted to sinter articles while being conveyed on a number of ceramic rollers arranged along a tunnel of the kiln. The rollers may be replaced by new rollers when they wear away or are damaged. The rollers also must be periodically demounted and cleaned when glaze on the articles is unintentionally applied to the rollers. On replacing or cleaning, the operation of the kiln must be stopped. If it takes a long time to demount the rollers from the kiln, the productivity will be reduced.

Japanese Utility Model Publication Sho 64-4072 discloses a modification of a roller hearth kiln. FIGS. 10, 11 and 12 in the accompanying drawings show such an apparatus for driving rollers. The apparatus comprises a number of rollers 2 extending from opposite sides of the tunnel through the walls 1 of the kiln. A rotary drive device 3 holds each of the rollers at one end and a support device 4 rotatably supports each of the rollers 2 at the other end. Each of the rollers 2 is kept in a spring 5 which is wound therearound at one end 2a. The outer periphery of the spring 5 is pressed by a plurality of pawls 7, such that the roller 2 is connected with a drive shaft 10 through a cylinder 8 via the spring 5. The drive shaft 10 is rotatably supported by a support frame 11 and receives a drive power from a source of drive through a sprocket 12. The driven end 2b of the roller 2 is supported, in two-point linear contact as shown in FIGS. 11 and 12, by a pair of receiver rollers 9 which are mounted on brackets 17 attached at frames 18 on the side hearth walls 1a. When the drive power is transmitted to the rollers 2 to rotate them, the receiver rollers 9 are also rotated.

In the prior art driving mechanism as mentioned above, each of the rollers 2 may be removed from the connection structure to draw the roller 2 in the righthand direction as viewed in FIG. 10. At this time, the spring 5 wound around the roller end 2a will be passed through the hearth at high temperature. Thus, the spring 5 will reduce its resiliency and may be accidentally removed out of the roller 2.

If there is any trouble in the hearth, the rollers might be driven in the reverse direction to convey articles toward the inlet side of the hearth. In such, a case, a frictional force will be created between each of the roller ends 2a and the corresponding spring 5, and will loosen the winding of the spring 5 to raise the pawls 7 into an opened state. Thus, the pawls 7 might be disengaged from the corresponding roller 2.

In the prior art, the rollers 2 made of ceramics were produced with an increased dispersion in external diameter for reasons of manufacturing experience. Such an increased dispersion could produce a slippage between each of the rollers 2 and the corresponding receiver roller 9 to make the speed of conveyance in the roller irregular. Therefore, the conveyance of articles does not proceed well. For example, a manufacturing tolerance equal to ± one millimeter may be created when a roller has its external diameter equal to 25 mm. A difference equal to six millimeters in distance of conveyance may be created between each pair of adjacent rollers through one complete revolution when a plurality of such rollers are used. This results in irregularity of conveyance due to the slippage between the rollers 2. Furthermore, either of the ceramic roller 2, and the metallic receiver roller 9 is easy to wear away since the both rollers have a difference in hardness. For example, if the external diameters of adjacent rollers 2, as shown in FIG. 11, are respectively equal to 24 mm and 26 mm and the external diameter of the respective receiver rollers 9 is equal to 40 mm, a deviation equal to 6 mm will be created between one roller 2 having its external diameter of 26 mm and the corresponding receiver roller 9 when the other roller 2 having its external diameter of 24 mm is rotated through one complete revolution. This results in slippage between the rollers to increase the wearing.

SUMMARY OF THE INVENTION

It is therefore an object of the present invention to provide an improved apparatus for driving rollers in the roller hearth kiln having means for connecting a metallic rotary drive shaft with a ceramic roller in a positive manner.

Another object of the present invention is to provide an apparatus for driving rollers in the roller hearth kiln comprising means for performing the mounting and demounting of a ceramic roller on the corresponding rotary drive shaft in a rapid manner.

A further object of the present invention is to provide an apparatus for driving rollers in the roller hearth kiln, comprising means for supporting the rollers without direct slippage to reduce the abrasion in the rollers and to improve the durability in the rollers, even if there is appreciably a dispersion in external roller diameter.

To this end, the present invention provides an apparatus for driving rollers in a roller hearth kiln, comprising a rotary drive shaft and a holder fixedly mounted at one end on said rotary drive shaft. A connection pipe of metal is detachably mounted on the other end of the holder and includes a positioning aperture formed therein, the positioning aperture extending along the longitudinal axis of said connection pipe. A plurality of ceramic rollers are arranged across a path of a kiln tunnel for conveying articles to be heat treated. Each roller is mounted on the opposite end of the connection pipe, extending to the side of the tunnel through the wall of the kiln. Resilient means fixedly is mounted at one end on the holder, the other end of the resilient means extending radially and being engageable with the positioning aperture of the connection pipes.

The apparatus for driving rollers may have the connection pipe fitted on the outerwall of said holder. The apparatus may also have the connection pipe fitted in the innerwall of said holder. The apparatus may have resilient means such as a leaf spring.

The present invention further provides an apparatus for driving rollers in a roller hearth kiln, comprising a rotary drive shaft, a holder fixedly mounted at one end the rotary drive shaft, a ceramic roller arranged across a path of a kiln tunnel for conveying articles to be heat treated, and a connection pipe of metal detachably mounted at one end on the other end of said holder. The other end of the connection pipe is connected with the ceramic roller and includes an axial slit formed therein. The connection pipe has openings formed through its sidewall at the peripheral position between the closed end of the axial slit and the opened end of the same. Fastening means extends through the openings of said connection pipe and is adapted to fasten the ceramic roller against the connection pipe such that the ceramic roller can be resiliently engaged by the connection pipe when the ceramic roller is inserted into the internal diameter of the connection pipe from the side of the opened slit end in the connection pipe.

The apparatus may include the closed end of the axial slit having an enlarged aperture which has a diameter larger than the width of the axial slit. The apparatus may also include the connection pipe having its external diameter equal to or smaller than the maximum external diameter of the ceramic roller. The apparatus may include the ceramic roller having a reduced-diameter portion which the other end of the connection pipe is mounted on.

The present invention furthermore provides a roller driving apparatus suitable for use in a roller hearth kiln. A plurality of ceramic rollers are arranged across a path of conveyance for articles to be heat treated, one end of the ceramic roller receiving a drive power from a source. The other driven end of the ceramic roller is supported on a supporting device. A metallic coil spring is wound on the outer periphery of the driven end of the ceramic roller. A metallic receiver roller is set for rotatably supporting the ceramic roller at its driven end through the coil spring.

Such a roller driving apparatus has the coil spring being wound in such a direction that the coil spring provides a clamping force against the external driven end of the ceramic roller when the ceramic roller is rotated while said receiver roller being stopped.

When resilient means such as a leaf spring mounted on the holder fixed to the rotary drive shaft is depressed, the connection pipe can be easily removed out of the corresponding holder. The roller is inserted into the metallic connection pipe detachably mounted on the metallic rotating shaft. When fastener means is then tightened against the connection pipe, the inner wall of the connection pipe will urged against the outer wall of the roller over a larger contact area through the flexure of the connection pipe wall at its slit. Thus, each of the rollers can be tightly and resiliently joined to the corresponding one of the connection pipes.

In the roller supporting structure of the present invention, the coil spring wound about each of the rollers at its driven end is brought into contact with the corresponding one of the receiver rollers such that the driven end of the roller will be supported by the receiver roller through the coil spring. Therefore, any slippage occurred between the driven end of the roller and the receiving roller can be absorbed by the coil spring.

BRIEF DESCRIPTION OF THE DRAWINGS

FIG. 1 is a schematic cross-section of a roller hearth kiln comprising a roller driving apparatus constructed according to the present invention.

FIG. 2 is a cross-sectional view, in an enlarged scale, illustrating a section shown by A in FIG. 1.

FIG. 5 is a side view of the roller supporting portion in the roller driving apparatus as viewed from the direction of arrow V in FIG. 4.

FIG. 6 is a graph illustrating the relationship between the axial displacement and the tension in the coil spring.

FIG. 7 is a cross-sectional view illustrating the primary portion of a modified roller connection in the roller driving apparatus constructed according to the present invention.

PREFERRED EMBODIMENT OF THE INVENTION

Figure 3:
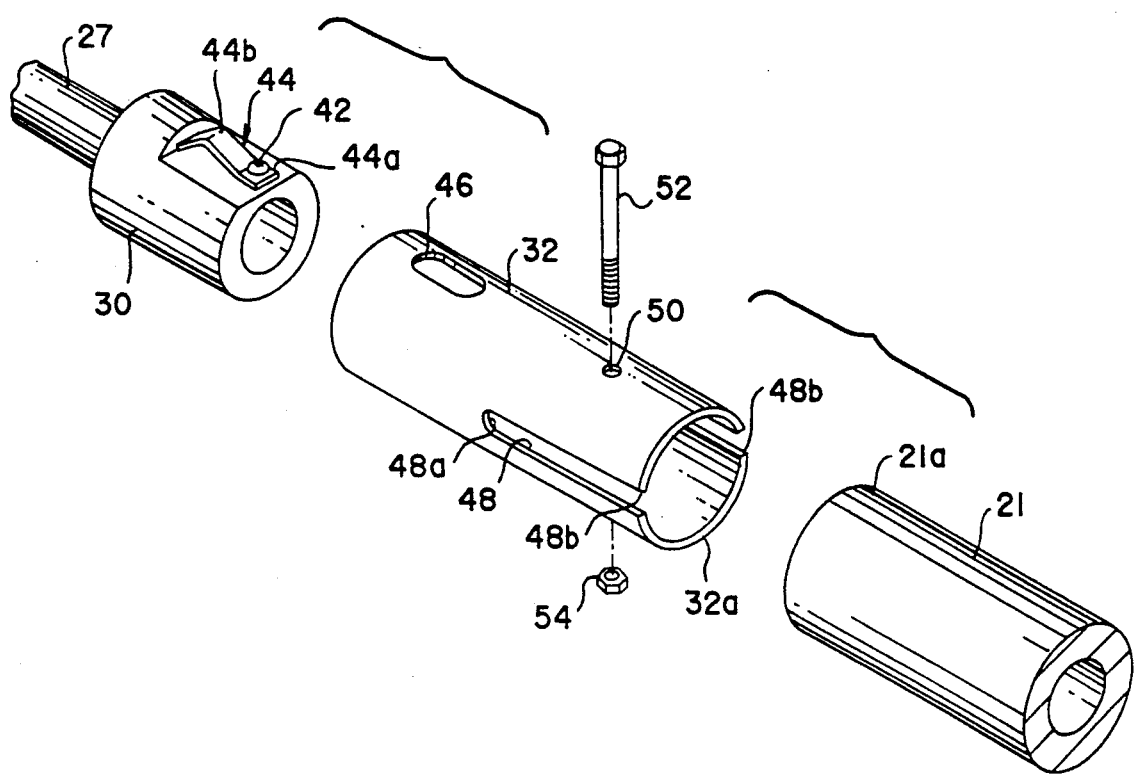
FIG. 3 is an exploded and perspective view illustrating the primary portion of the roller connection in the roller driving apparatus of the present invention.

The improved technique and apparatus of the present invention for conveying articles to be heat treated through a kiln tunnel can best be illustrated by showing a roller hearth kiln comprising a roller driving apparatus as shown in FIGS. 1-9.

In FIG. 1 through 6, a roller hearth kiln constructed according to the first embodiment of the invention is shown.

The roller hearth kiln comprises a number of ceramic pipe-shaped rollers 21 arranged side by side through the walls 1 of the kiln. When these rollers 21 are rotated, articles to be heat treated (not shown) will be heat-treated while moving along a path of conveyance within the hearth. Each of the rollers 21 is held at one end 21a by a rotary drive device 22 with the other end 21b thereof being supported by a support device 23.

The rotary drive device 22 includes a rotary drive shaft 27 which is rotatably supported by a support frame 25 through bearings 26. The rotary drive shaft 27 includes a sprocket 28 fixedly mounted thereon at the middle of the shaft. A chain is passed over the sprocket 28 and operatively connected to a drive motor (not shown). Thus, drive power can be transmitted from the drive motor to the roller 21 at its one end (drive end) 21a through a holder 30 and a connection pipe 32.

The holder 30 defines a connection 40 together with the corresponding connection pipe 32. FIG. 2 shows the details of the connection 40 indicated by a circle A in FIG. 1. The holder 30 is made of any suitable metal and formed into a cylindrical configuration. The holder 30 fixedly receives one end 27a of the rotary drive shaft 27 and in turn is inserted into the connection pipe 32.

The holder 30 includes a recess 30a formed on the outer peripheral wall thereof. Within the recess 30a, a leaf spring 44 is fastened by a pin 42 at the mounting portion 44a of the leaf spring 44. The leaf spring 44 also includes a folded portion 44b resiliently engaging the inner edge of a positioning aperture 46 which is formed in the cylindrical connection pipe 32. Thus, the holder 30 can be connected with the connection pipe 32. The external diameter of the holder 30 is substantially equal to the internal diameter of the connection pipe 32.

The connection pipe 32 includes a pair of diametrically opposing slits 48 formed therein at the opened end 32a facing the corresponding roller 21. Each of the slits 48 extends axially up to about 50% of the whole length of the connection pipe 32. The length of the axial slits 48 is desirably ranged between 40%-80% of the whole length of the connection pipe 32. If the length of the axial slits 48 is less than 40% of the whole length of the connection pipe 32, a clamping force will be insufficiently exerted between the holder 30 and the connection pipe 32 by a combination of bolt 52 and nut 54 which is used as fastener means. If the length of the axial slits 48 is more than 80% of the whole length of the connection pipe 32, the connection pipe 32 will be reduced in its strength. It is appropriate that the width of the axial slits 48 is ranged between 0.5 mm and 2 mm. If the width of the slits 48 is less than 0.5 mm, the slits 48 do not provide a satisfactory resilience with bending to the gap. If the width of the slits 48 is more than 2 mm, the connection pipe 32 will also be reduced in its strength.

The connection pipe 32 includes a pair of diametrically opposing openings 50 each of which is formed therethrough at a position angularly offset about 90 degrees from the corresponding slit 48 at the longitudinally middle portion thereof. Each of the openings 50 receives a bolt 52 which extends outward at one end from the opposite sidewall of the connection pipe 32. The outward extended end of the bolt 52 is fitted by a nut 54. When the nut 54 is tightened against the bolt 52, the connection pipe 32 is firmly clamped against the corresponding roller 21 at one end 21a. At this time, the axial slits 48 will be reduced in width at the opened end 48b rather than the closed end 48a. Thus, the connection pipe 32 can be more firmly clamped against the ceramic roller 21 at the one end 21a. Since the inner wall of the connection pipe 32 is urged against the outer wall of the end 21a of the roller 21 under uniform pressure, stress concentration can be avoided to provide a tightly resilient connection between the connection pipe 32 and the corresponding roller 21.

If the roller 21 becomes damaged, or broken, pushing the roller 21 in the opposite direction of arrow C as shown in FIG. 2 results in that the leaf spring 44 will contact its right slope with the inner wall of said connection pipe 32, and the leaf spring 44 is depressed at its folded portion 44b to disengage it from the positioning aperture 46. Thus, after rotating and pulling the roller 21, the connection pipe 32 and the corresponding roller 21 can be drawn out together in the direction of arrow C in FIG. 2. Furthermore, the roller 21 can be rapidly drawn out from the wall 1 of the hearth toward the support device 23. In such a manner, the damaged roller 21 can be removed rapidly and simply from the kiln.

When a roller 21 is to be mounted in the kiln, the roller 21 is resiliently joined at one end 21a with the connection pipe 32 which in turn is moved in the direction opposite to the direction of arrow C in FIG. 2. The connection pipe 32 then receives the holder 30 with the positioning aperture 46 thereof being resiliently engaged by the folded portion 44b of the leaf spring 44. In such a manner, the connection pipe 32 can be connected firmly with the holder 30.

On the other hand, the support device 23 comprises a bracket 34 fixedly attached to the opposite side wall 1 of the hearth, a stationary shaft 35 fixedly mounted on the bracket 34 and a pair of metallic receiver rollers 36 each of which is rotatably mounted on the stationary shaft 35 through a bearing. The receiver roller 36 rotatably supports the corresponding roller 21 at the other end 21b thereof through a coil spring 60 which will be described later.

Figure 4:
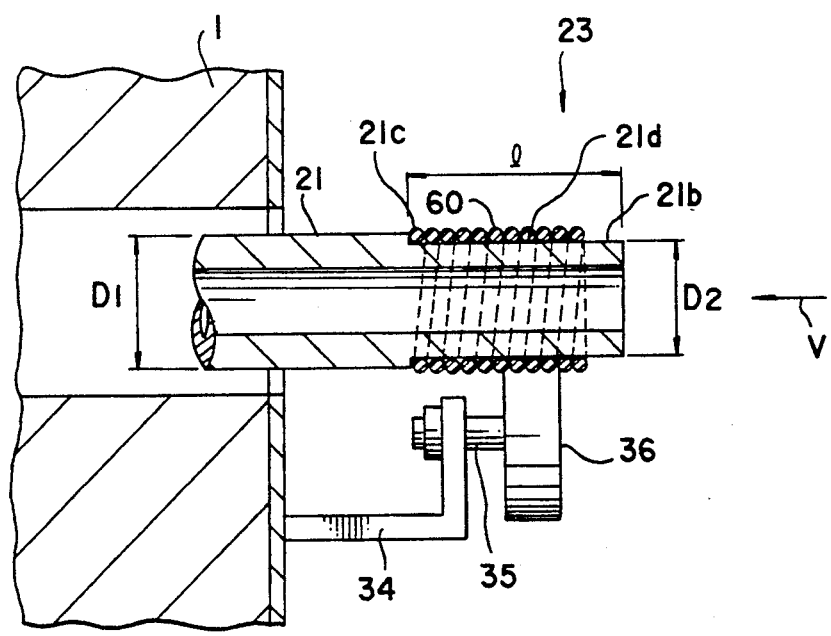
FIG. 4 is a cross-sectional view, in an enlarged scale, illustrating a section shown by B in FIG. 1.

FIG. 4 shows the details of a section shown by a circle B in FIG. 1. As seen from FIG. 4, the other end (driven end) 21b of the roller 21 includes a stepped portion 21c having an external reduced-diameter portion by 21d. A metallic coil spring 60 is wound about the external reduced diameter portion 21d of the roller 21. The length of the external reduced-diameter portion 21d is preferably ranged between about 10 mm-100 mm, depending on the size of the roller 21.

It is desirable that the coil spring 60 is wound in such a direction that when the roller 2 is rotated while the receiver roller 36 is stopped, the coil spring 60 will provide a clamping force against the external reduced diameter portion 21d of the roller 21. This is for the reason that the coil spring 60 can be prevented from being accidentally removed out of the external reduced-diameter portion 21d of the roller 21. It is also desirable that the coil spring 60 has a predetermined initialtension therein as shown in FIG. 6. This initialtension serves to inhibit the longitudinal elongation of the coil spring 60 when it receives heat from the interior of the hearth through the corresponding roller 21. Material of which the coil spring 60 is made is preferably selected from various metal materials each having a hardness substantially equal to that of the receiver rollers 36. In such a manner, the relative abrasion can be positively suppressed between the coil spring 60 and the receiver rollers 36 placed in linear contact with the coil spring 60 at two spaced points as shown in FIG. 5. It is further suitable that the line diameter of the coil spring 60 is ranged between one-four millimeters. This is for a reason that when the coil spring 60 has been wound around the outer periphery of the corresponding roller 21 and if the line diameter of the coil spring 60 is less than one millimeter the coil spring 60 can be easily loosened. If the line diameter of the coil spring 60 is more than four millimeters, it becomes difficult to mount it around the roller 21.

In such an arrangement, a drive power rotates the rotary drive shaft 27 and is transmitted to the roller 21 through the connection pipe 32 via the holder 30 and the leaf spring 44. In such a case, since the drive power is transmitted from the holder 30 to the connection pipe 32 through the connection in which the folded portion 44b of the leaf spring 44 is engaged by the positioning aperture 46 in the connection pipe 32, the leaf spring 44 will never be removed from the connection pipe 32 to provide a positive transmission of power at the connection.

When it is required to remove a roller 21 for replacement or repair, the roller 21 is pressed toward the rotary drive shaft 27 to bend the folded portion 44b of the leaf spring 44 in the radial and inward direction such that the leaf spring 44 will be displaced out of the positioning aperture 46 in the connection pipe 32. The connection pipe 32 is then rotated clockwise or counter-clockwise relative to the holder 30 such that the folded portion 44b of the leaf spring 44 will be slidably brought into contact with the inner wall of the connection pipe 32. The roller 21 connected with the connection pipe 32 is then drawn out from the holder 30. In such a manner, the roller 21 can be easily and simply separated from the holder 30.

When it is desired to mount a roller 21, at first the connection pipe 32 connected to the roller 21 is then fitted over the corresponding holder 30. This causes the folded portion 44b of the leaf spring 44 to flex in the radial and inward direction under its own elasticity and also to slide on the inner wall of the connection pipe 32. Thereafter, the adjustment of axial or rotational movement causes the folded portion 44b of the leaf spring 44 to fit into the positioning aperture 46 of the connection pipe 32. In such a manner, the connection pipe 32 can be firmly connected to the holder 30 in an easy and simple manner.

The roller connecting structure of the illustrated embodiment has an advantage in that each of the rollers 21 can be firmly connected with the corresponding rotary drive shaft 27 through the holder 30 and the connection pipe 32 while for any damage in a roller 21, it can be easily and rapidly drawn out from the holder 30 by removing the connection pipe 32 out of the holder 30 connected with the rotary drive shaft 27.

The roller connecting structure also has the following advantages:

(1) Any adhesive or adhering step is not required to connect a roller 21 with the corresponding connection pipe 32.

(2) It is easy to correct axial offset between the connection pipe 32 and the roller 21.

(3) There will not be provided any disconvenience such as removal of the connection pipe 32 even if an old or damaged roller 21 is replaced by a new roller during running of the kiln.

(4) A rotational drive power can be transmitted from the rotary drive shaft 27 to the roller 21 through the holder 30 and the connection pipe 32 without a specific urging mechanism.

(5) It is not required to form an aperture or slot in the ceramic roller 21. Therefore the rollers 21 become no more damaged.

If the coil spring 60 wound around the external reduced-diameter portion 21d of the corresponding roller 21 has its peripheral spaced different from that of the receiver rollers 36, a slippage occurs between the coil spring 60 and the receiver roller 36. A force associated with this slippage serves to clamp the coil spring 60 against the external reduced diameter portion 21d so that the ceramic roller 21 will be uniformly clamped by the coil spring 60. Thus, the external reduced-diameter portion 21d of each roller 21 will apparently be of a substantially uniform size through the coil spring 60. Therefore, all the rollers 21 will apparently have substantially the same external diameter. This can stabilize the speed of conveyance for articles to be heat treated.

If the receiver rollers 36 are made of a metal material having substantially the same hardness as that of the coil spring 60, abrasion can be reduced in either or both of the receiver rollers 36 and coil spring 60 to improve their durability. Even if any abrasion is created in either of the coil spring 60 or receiver roller 36, a new component can replace the abraded component without the replacement of an expensive ceramic roller 21. Thus, all the ceramic rollers 21 can be used in a prolonged service life, leading to reduction of cost.

FIG. 7 shows the second embodiment of the present invention in which the connection between a rotary drive shaft and the corresponding connection pipe is improved.

In the second embodiment as shown in FIG. 7, a roller connecting structure comprises a connection pipe 65 having its external diameter smaller than the internal diameter of a roller 21 and a holder 67 having its internal diameter larger than the external diameter of the connection pipe 65. The connection pipe 65 has one end to be inserted into the internal diameter of the holder 67. This end of the connection pipe 65 includes a rectangular positioning aperture 68 formed therein and extending axially in the end to be inserted. On the other end, the holder 67 includes an opening 69 formed therein at a position corresponding to the positioning aperture 68 of the connection pipe 65. A leaf spring 70 is fastened on the holder 67 at one end as shown by 70a such that the other end of the leaf spring 70 can be received into the positioning aperture 68 through the opening 69 in the holder 67. The other end 70b of the leaf spring 70 is urged into the positioning aperture 68 under its own resiliency. When the side faces of the leaf spring 69 are engaged by the sidewalls of the positioning aperture 68, a rotational drive force can be transmitted therebetween. The leaf spring 70 is of such a configuration that it has a gently sloped angle at the mounting side while having a sharply sloped angle at the opposite side. Thus, the leaf spring 70 maintains its original position when the corresponding roller 21 is pulled rightward from such a position as shown in FIG. 7. However, the leaf spring 70 will move its right-hand slope upward to disengage from the positioning aperture 68 by engagement with the right-hand edge of the positioning aperture 68 when the roller 21 is pressed leftward from such a position as shown in FIG. 7.

In the second embodiment of the present invention, when it is required to remove a roller 21 for replacement or repair, the roller 21 is pressed toward the corresponding rotary drive shaft 27 to shift the folded portion 70b of the leaf spring 70 in the radial and outward direction out and then to be brought out of engagement with the positioning opening 69. The connection pipe 65 is then rotated clockwise or counter-clockwise relative to the holder 67 such that the folded portion 70b of the leaf spring 70 will slide on the outer wall of the connection pipe 65. As a result, the roller 21 connected with this connection pipe 65 can be drawn out from the holder 67. In such a manner, the separation of the roller 21 from the holder 67 can be carried out easily according to the present invention.

Since the external diameter of the connection pipe 65 is smaller than the internal diameter of the roller 21, it does not prevent the roller 21 from being removed from contact with any ambient matter such as brick or the like when the roller 21 is drawn out from the hearth wall 1. The connection pipe 65 also will not interfere the grinding operation of the roller 21 since the external diameter of the connection pipe 65 is smaller than the internal diameter of the roller 21.

Figure 8:
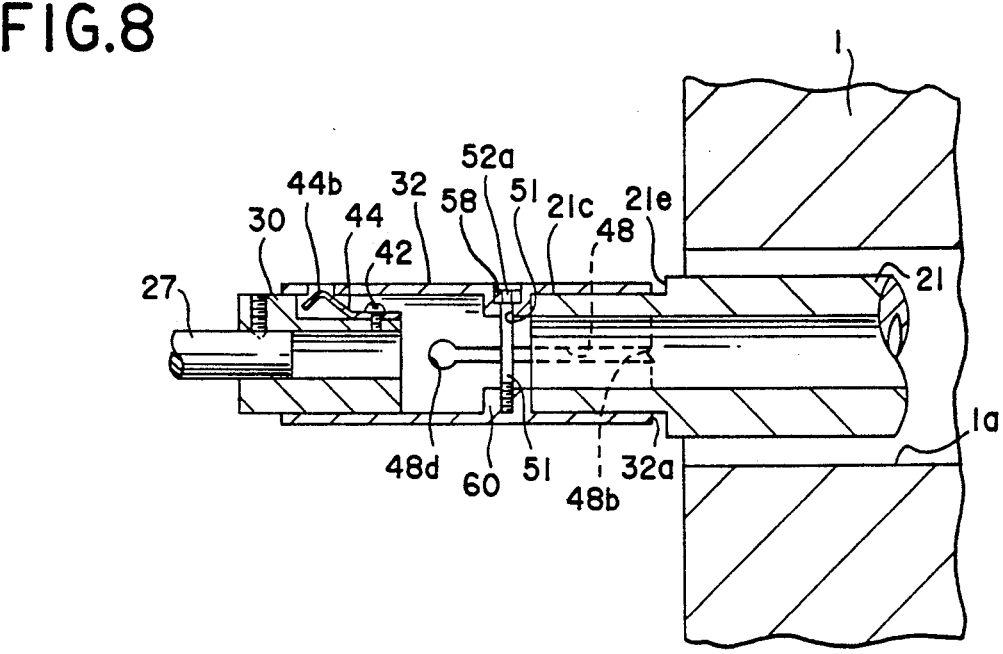
FIG. 8 is a cross-sectional view illustrating the primary portion of a further modified roller connection in the roller driving apparatus constructed according to the present invention.
Figure 9:
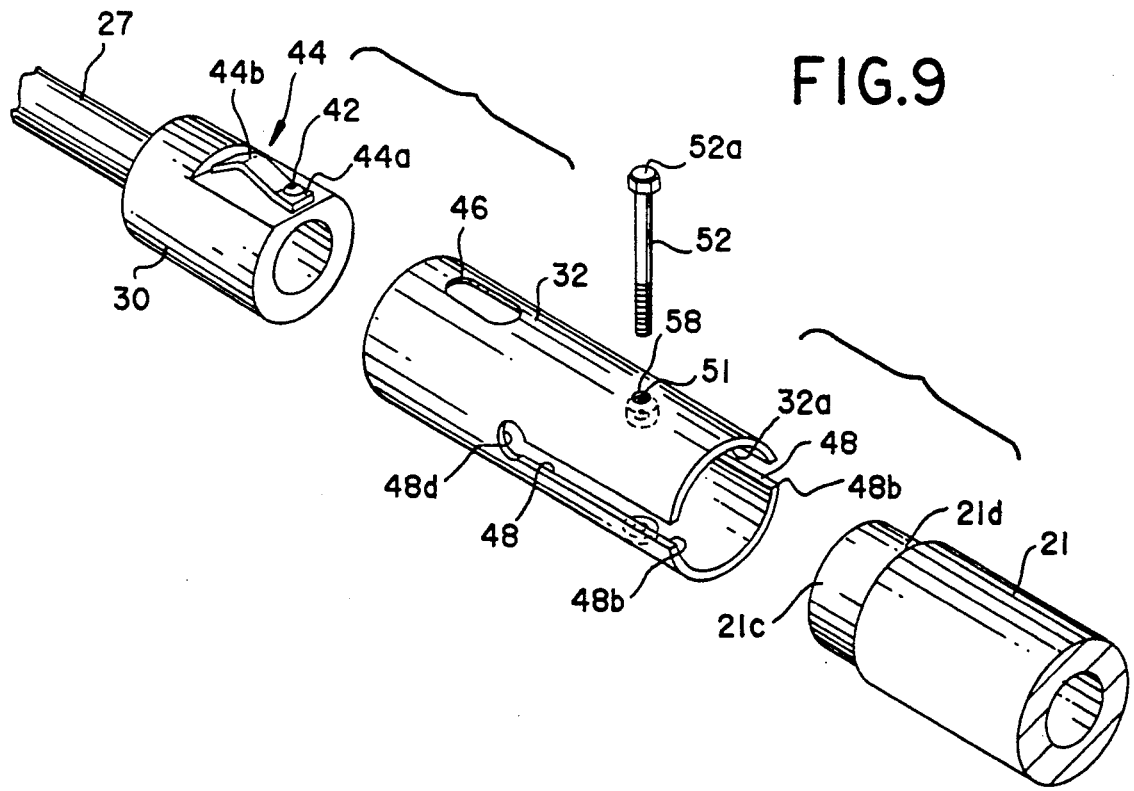
FIG. 9 is an exploded and perspective view illustrating the primary portion of the roller connection shown in FIG. 8.
Figure 10:
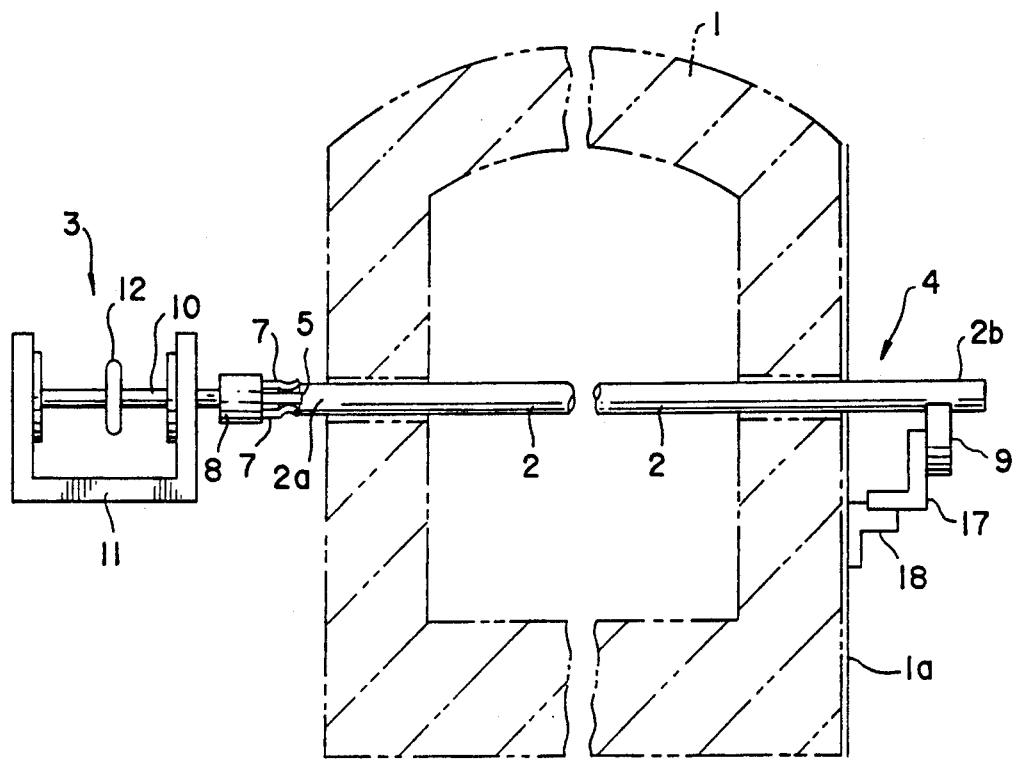
FIG. 10 is a front elevational view of a roller driving apparatus in the prior art roller hearth kiln.
Figure 11:
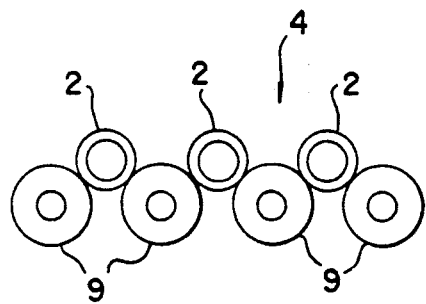
FIG. 11 is a side view illustrating conveying rollers and receiver rollers in the prior art roller hearth kiln.
Figure 12:
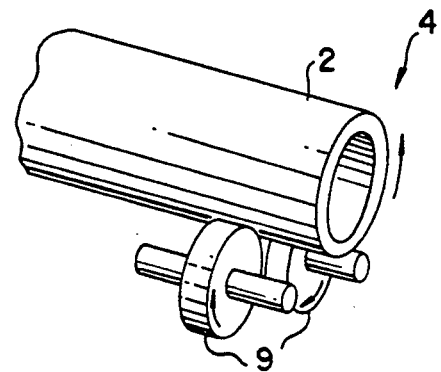
FIG. 12 is a perspective view illustrating driving roller and receiver rollers in the prior art.

FIGS. 8 and 9 show the third embodiment of the present invention in which the connection between a connection pipe and a roller is improved.

In the third embodiment, parts similar to those of the embodiment shown in FIGS. 1 and 3 are denoted by similar reference numerals and will not further be described. The end of the roller 21 adjacent to the drive includes an external reduced-diameter portion 21c continuing to the annular step 21e. The axial length of the external reduced-diameter portion 21c is substantially equal to the distance from the opened end 32a of the connection pipe 32 to an opening 51 formed through the sidewall of the connection pipe 32.

Each of the slits 48 formed in the connection pipe 32 includes an enlarged aperture 48d of circular configuration formed therein at the closed end, the diameter of this aperture 48d being larger than the width of the corresponding slit 48. The aperture 48d serves to avoid stress concentration at the closed slit end on bolt fastening and to promote a resilient flexure in the sidewall of the connection pipe 32 at the opened end 48b of the slit 48.

The opening 51 is adapted to receive a bolt 52 at the bolt head 52a and is located to a recess 58 formed in the connection pipe 32. The bolt head 52a is also received within this recess 58. In other words, the bolt head 52a is located at a position offset radially and inwardly from the outer periphery of the connection pipe 32. The opposite threaded end of the bolt 52 is screwed into a female threaded hole which is tapped in a recess 60 diametrically opposite to the recess 58.

When a roller 21 are removed from the hearth wall, the folded portion 44b of the leaf spring 44 is pressed to disengage the connection pipe 32 from the holder 30. In such a situation, the connection pipe 32 and the roller 21 is drawn out toward the support device 23, thus the roller 21 and the connection pipe 32 can be drawn out easily through the roller insert opening aa. In such a case, the connection pipe 32 will not be brought into contact with the sidewall of the roller insert opening 1a to damage heat-resistance insulating materials when the combination of the connection pipe 32 with the roller 21, since the external diameter of the connection pipe 32 is equal to or smaller than that of the roller 21.

In addition to the aforementioned advantages, the third embodiment of the present invention provides the following advantage: Since the opened end 32a of the connection pipe 32 is located radially and inwardly from the external diameter of the corresponding roller 21, the opened end 32a of the connection pipe 32 will not be brought into contact with the hearth wall when the combination of the connection pipe 32 with the roller 21 is removed from the hearth wall. Thus, the hearth wall and other components associated therewith will not be damaged by this combination being removed.

Although the first to third embodiments have been described as to the bolt-nut type fastening means used at the connection between each of the rollers and the corresponding connection pipe, the fastening means may be of any suitable type other than the bolt-nut type. The leaf springs 44 and 70 may be replaced by any other suitable resilient means. Furthermore, the external reduced-diameter portion 21d of the roller 21 may not be required when each of the rollers has its external diameter increased in precision.

The aforementioned numeral values for the external diameter $D_1$ of each roller 21, the external diameter $D_2$ of the external reduced-diameter portion 21d, the axial length l of the same external reduced-diameter 21d and the line diameter of each coil spring 60 are not intended to limit them and may be selected suitably depending on the necessity.

According to the roller driving structure of the present invention, each of the ceramic rollers is connected with the corresponding one of the metallic rotary drive shafts through an appropriate resilient means such that a drive power can be positively transmitted to the rollers. Furthermore, each of the rollers can be rapidly and easily mounted or demounted in the roller hearth kiln. In addition, there are provided many advantages in that the roller will not be accidentally removed from the associated connection when the kiln is running, that the roller driving structure may be simplified and manufactured more inexpensively, that each of the rollers may be easily ground and easily drawn out from the hearth wall since the external diameter of the connection pipe can be smaller than that of the rollers. Since the leaf spring is mounted on the holder adjacent to the drive shaft, the roller may be drawn out from the interior of the roller hearth kiln without the associated leaf spring being passed through the kiln at its high temperature. Therefore, all the leaf springs will not be degrated due to heat.

In the roller supporting device of the present invention, the driven end of the ceramic roller is supported on the pair of metallic receiver rollers through a metallic coil spring. Thus, slippage occurred between the conveying roller and the associated receiver rollers may be absorbed through the coil spring. This results in reduction of abrasion and provides a stabilized speed of the conveying rollers to improve the characteristics of conveyance.

While the invention has been described in connection with what is presently considered to be the most practical and preferred embodiment, it is to be understood that the invention is not limited to the disclosed embodiment but, on the contrary is intended to cover various modifications and equivalent arrangements included within the spirit and scope of the appended claims.

What is claimed is:

1. A roller driving apparatus for use in a roller hearth kiln having a kiln tunnel and kiln side walls, comprising:
   a rotary drive shaft receiving drive power from a source;
   a holder fixedly mounted at one end thereof on said rotary drive shaft;
   a connection pipe of metal detachably mounted on the other end of said holder and including a positioning aperture formed therein, said positioning aperture extending along the longitudinal axis of said connection pipe;
   a ceramic roller arranged across a path of conveyance for articles to be heat treated, being mounted at a drive end thereof on an end of said connection pipe opposite to said holder for receiving drive power from said rotary drive shaft, said ceramic roller having another, driven end; said ceramic roller extending through the kiln tunnel through one of the kiln side walls of the roller hearth kiln;
   engaging means fixedly mounted at one end of said holder, for selectively engaging with said positioning aperture of said connection pipe wherein said engaging means includes a leaf spring fixedly mounted at one end thereof on said holder, and wherein the other end of said leaf spring extends radially and is engageable with said positioning aperture in said connection pipe, and wherein a side portion of said leaf spring transmits rotational forces between said roller and said connection pipe;
   a metallic coil spring wound on an outer periphery of said driven end of said ceramic roller; and
   a metallic receiver roller rotatably supporting said driven end of said ceramic roller through said metallic coil spring.

2. A roller driving apparatus as defined in claim 1, wherein said coil spring is wound in such a direction that said coil spring provides a clamping force against an external periphery of said driven end of said ceramic roller when said ceramic roller is rotated while said metallic receiver roller is stopped.

3. A roller driving apparatus as defined in claim 1, wherein said outer periphery of said driven end of said ceramic roller has a reduced outer diameter portion for receiving and retaining said metallic coil spring.

4. A roller driving apparatus as defined in claim 1, wherein said connection pipe has an external diameter which is equal to or smaller than the maximum external diameter of said ceramic roller.

5. A roller driving apparatus as defined in claim 1, wherein said connection pipe has a hollow interior and has an outer diameter which is substantially the same as an external periphery of a median portion of said ceramic roller, and wherein said drive end of said ceramic roller has an outer diameter which is smaller than that of said connection pipe, such that said drive end of said ceramic roller can be received within a hollow interior of said connection pipe.

* * * * *